(12) United States Patent
Huang et al.

(10) Patent No.: US 7,692,829 B2
(45) Date of Patent: Apr. 6, 2010

(54) SCAN METHOD AND SCANNER UTILIZING THE SAME

(75) Inventors: Chi-Chin Huang, Tainan (TW); Chien-Hsing Tang, Taipei (TW)

(73) Assignee: Qisda Corporation, Taoyuan County (TW)

( * ) Notice: Subject to any disclaimer, the term of this patent is extended or adjusted under 35 U.S.C. 154(b) by 223 days.

(21) Appl. No.: 11/944,378

(22) Filed: Nov. 21, 2007

(65) Prior Publication Data
US 2008/0117480 A1 May 22, 2008

(30) Foreign Application Priority Data
Nov. 22, 2006 (TW) .............................. 95143133 A (51) Int. Cl.
*H04N 1/04* (2006.01)
(52) U.S. Cl. ................... 358/498; 358/496; 358/488; 358/486; 399/367; 399/371

(58) Field of Classification Search .................. 358/498, 358/496, 488, 474, 401, 465, 505, 501, 486; 399/371, 367
See application file for complete search history.

(56) References Cited

U.S. PATENT DOCUMENTS
5,455,690 A * 10/1995 Ishikawa .................... 358/461

FOREIGN PATENT DOCUMENTS
JP          58111474 A  *  7/1983

* cited by examiner

*Primary Examiner*—Cheukfan Lee (57) ABSTRACT

A scan method includes providing a scanner, including an image sensor, a reference pattern and a transmission mechanism. The image sensor scans the reference pattern to generate reference data. The transmission mechanism transmits at least one recording media between the reference pattern and the image sensor. Finally, the image sensor generates scan data, and the scanner compares the scan data with the reference data to obtain a transmission condition thereof.

14 Claims, 9 Drawing Sheets

SCAN METHOD AND SCANNER UTILIZING THE SAME

BACKGROUND OF THE INVENTION

1. Field of the Invention

The invention relates to a scan method, and in particular to a scan method reducing the number of required detectors.

2. Description of the Related Art

Figure 1A:
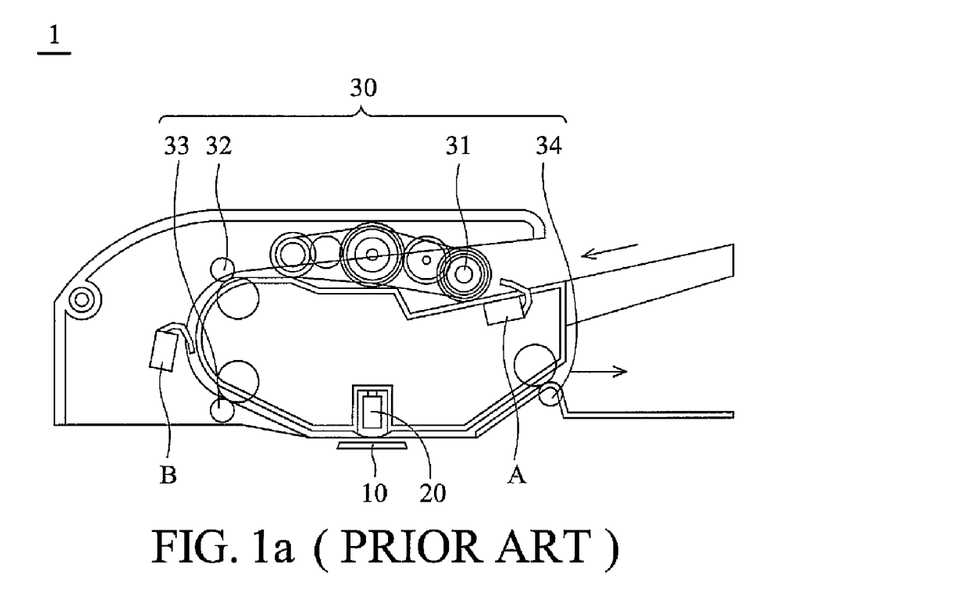
FIG. 1a shows a conventional scanner.

FIG. 1a shows a conventional scanner 1, comprising a media detector A, a scan-in detector B, an image sensor 10, a weight 20 and a transmission mechanism 30. Transmission mechanism 30 comprises a pick arm 31, a roller 32, a roller 33 and a roller 34.

When scanner 1 scans, recording media passes between weight 20 and image sensor 10, and image sensor 10 captures image data therefrom.

Figure 1B:
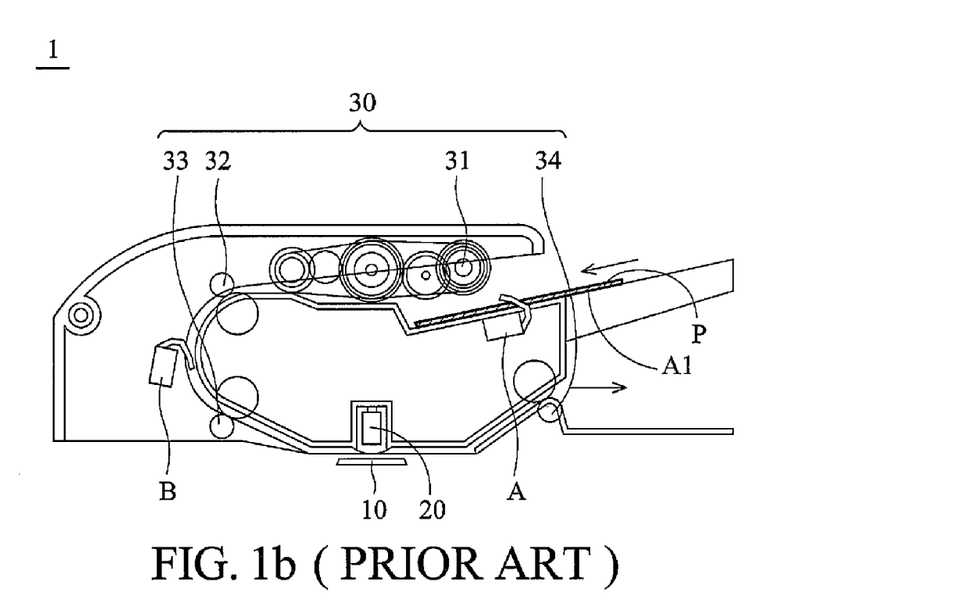
FIG. 1b shows function of media detector.

With reference to FIG. 1b, media detector A detects whether recording media P is in a transmission position A1, and scanner 1 performs scan process by auto document feeder or flatbed according to the detection result. When recording media P actuates the media detector A, the pick arm 31 raises, allowing placement of recording media P into the scanner 1. During scanning, if the media detector A confirms the presence of recording media P in the transmission position A1, the scanner 1 continues the scan process.

Figure 1C:
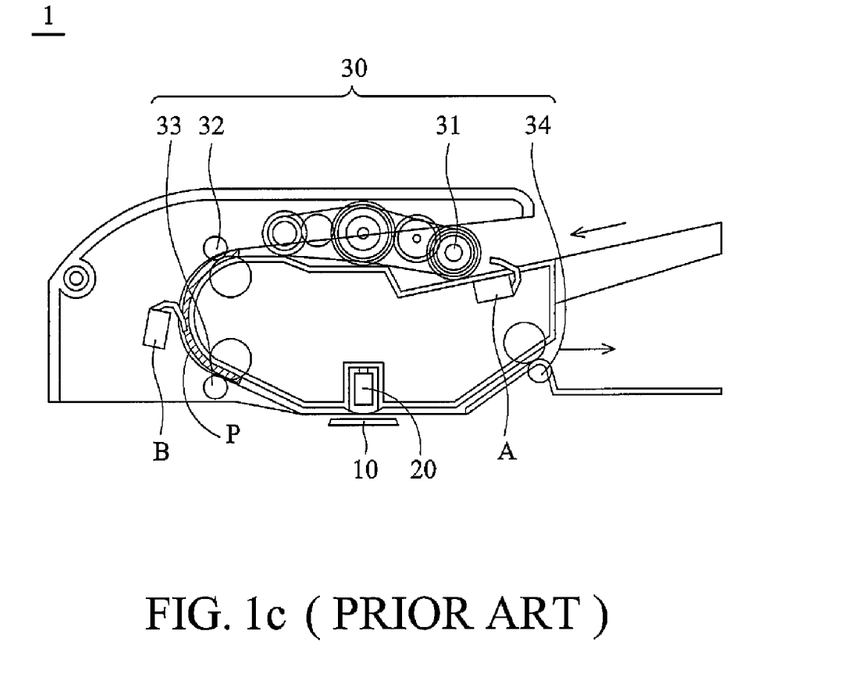
FIG. 1c shows function of scan-in detector.

With reference to FIG. 1c, scan-in detector B confirms a distance between recording media P and a scan position, the position of the recording media P (in or out of the scanner 1), and detects paper jam.

In conventional scanning, first, media detector A detects the presence of recording media P in transmission position A1. If present, transmission mechanism 30 transmits recording media P toward the image sensor 10. When recording media P actuates scan-in detector B, image sensor 10 scans the recording media P. Finally, when media detector A and the scan-in detector B detect no recording media P, the scanner 1 stops.

In conventional scanning, more then two detectors are required, increasing costs.

U.S. Pat. No. 5,844,698 discloses a scan method, however, only one sheet of recording media can be scanned in a single scan process rather then continuous scanning of a plurality of recording media, since paper jam is indistinguishable from lack of media altogether.

BRIEF SUMMARY OF THE INVENTION

A detailed description is given in the following embodiments with reference to the accompanying drawings.

The invention provides a scan method in which a scanner is provided, comprising an image sensor, a reference pattern and a transmission mechanism. The image sensor scans the reference pattern to generate reference data. Next, the transmission mechanism transmits at least one recording media between the reference pattern and the image sensor. Finally, the image sensor generates scan data, and the scanner compares the scan data with the reference data to obtain a transmission condition thereof.

The embodiment reduces the required number of detectors and, thus, cost.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 2A:
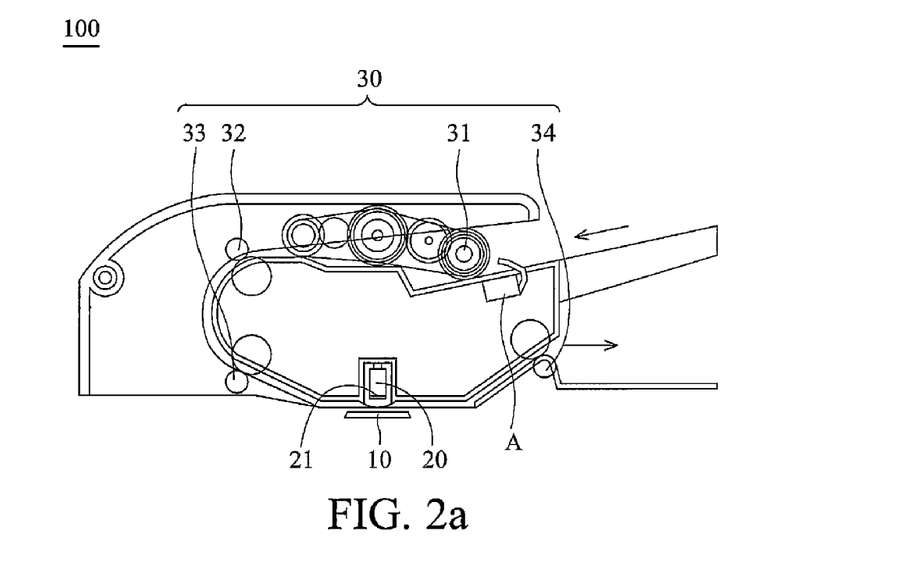
FIG. 2a shows a scanner of a first embodiment of the invention.

FIG. 2a shows a scanner 100 of a first embodiment, comprising a media detector A, an image sensor 10, a memory (not shown), a weight 20 and a transmission mechanism 30. The transmission mechanism 30 comprises a pick arm 31, a roller 32, a roller 33 and a roller 34. The weight 20 comprises a reference pattern 21 corresponding to the image sensor 10.

Figure 2B:
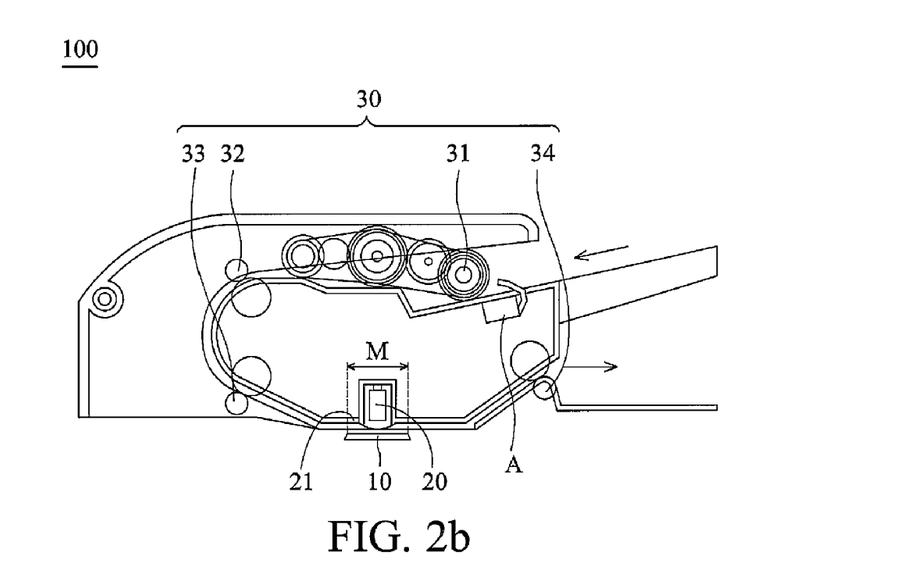
FIG. 2b shows a modified embodiment.

With reference to FIG. 2b, in an embodiment, the reference pattern 21 is not disposed on the weight 20. In FIG. 2b, the reference pattern 21 is disposed on the surface of the scanner 100 corresponding to the image sensor 10. The reference pattern 21 is disposed in an area M above the image sensor 10.

Figure 3:
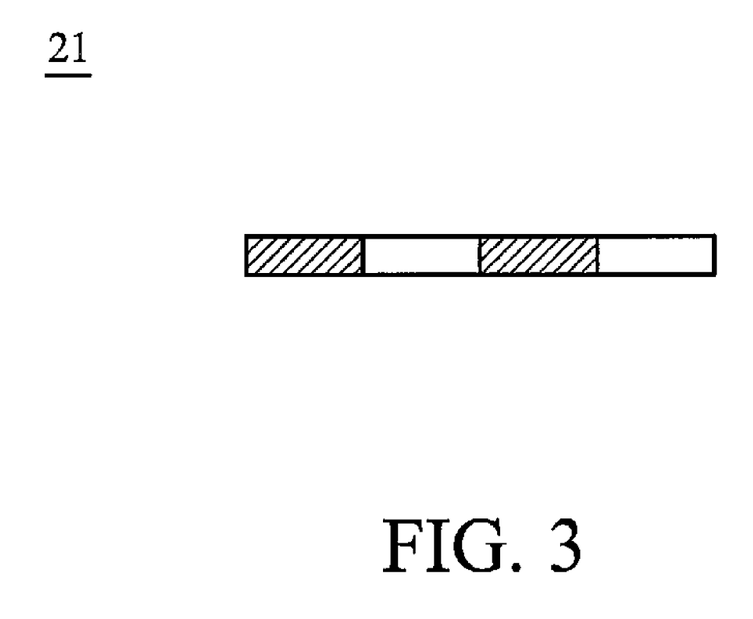
FIG. 3 shows a reference pattern.

With reference to FIG. 3, the reference pattern 21 comprises alternate black and white or other pattern. The image sensor 10 scans the reference pattern 21 to generate reference data. The scanner 100 stores the reference data into the memory. The reference data can be stored when the scanner 100 is manufactured or started.

When the scanner 100 scans, recording media passes between the weight 20 and the image sensor 10, and the image sensor 10 captures image data therefrom.

In the embodiment, control the number of detectors required is reduced, and thus cost. In the first embodiment, scan-in detector is omitted.

Figure 4A:
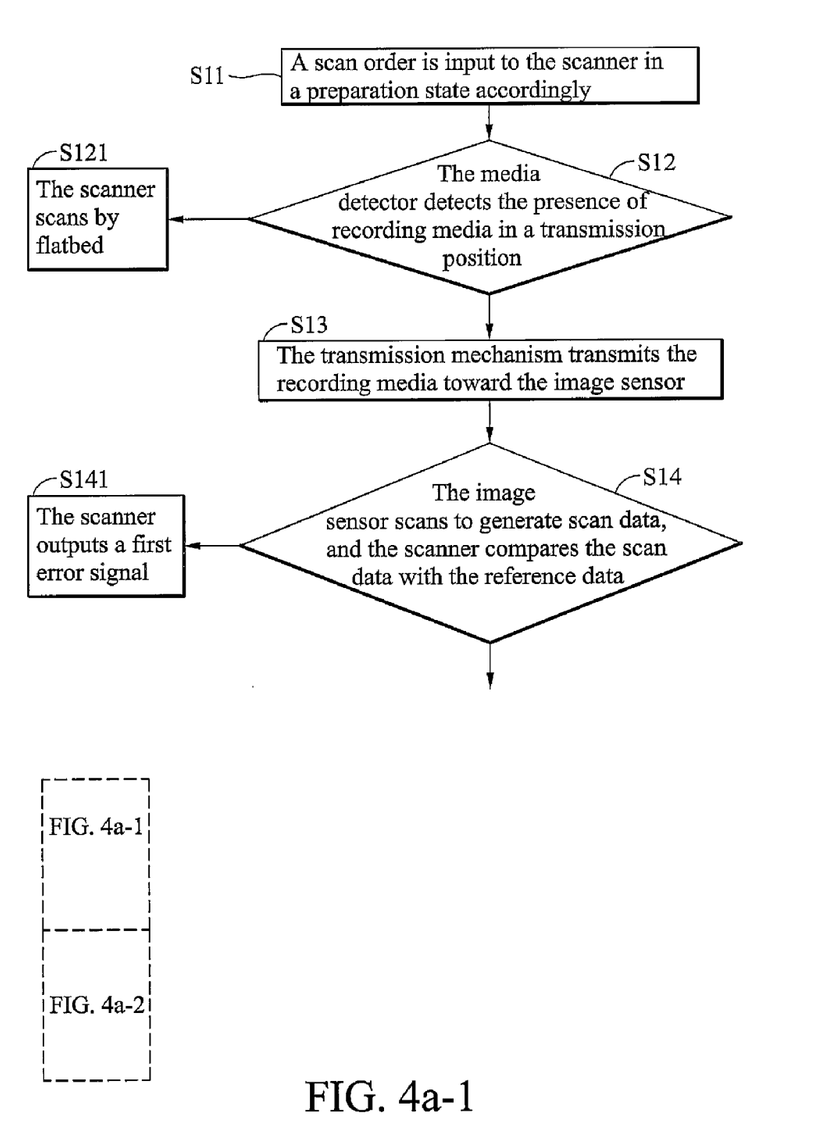
FIG. 4a is a flowchart of the first embodiment.
FIG. 4b shows recording media in a transmission position.
FIG. 4c shows recording media passing between an image sensor and a weight.
FIG. 4d shows recording media leaving the image sensor.
Figure 4A:
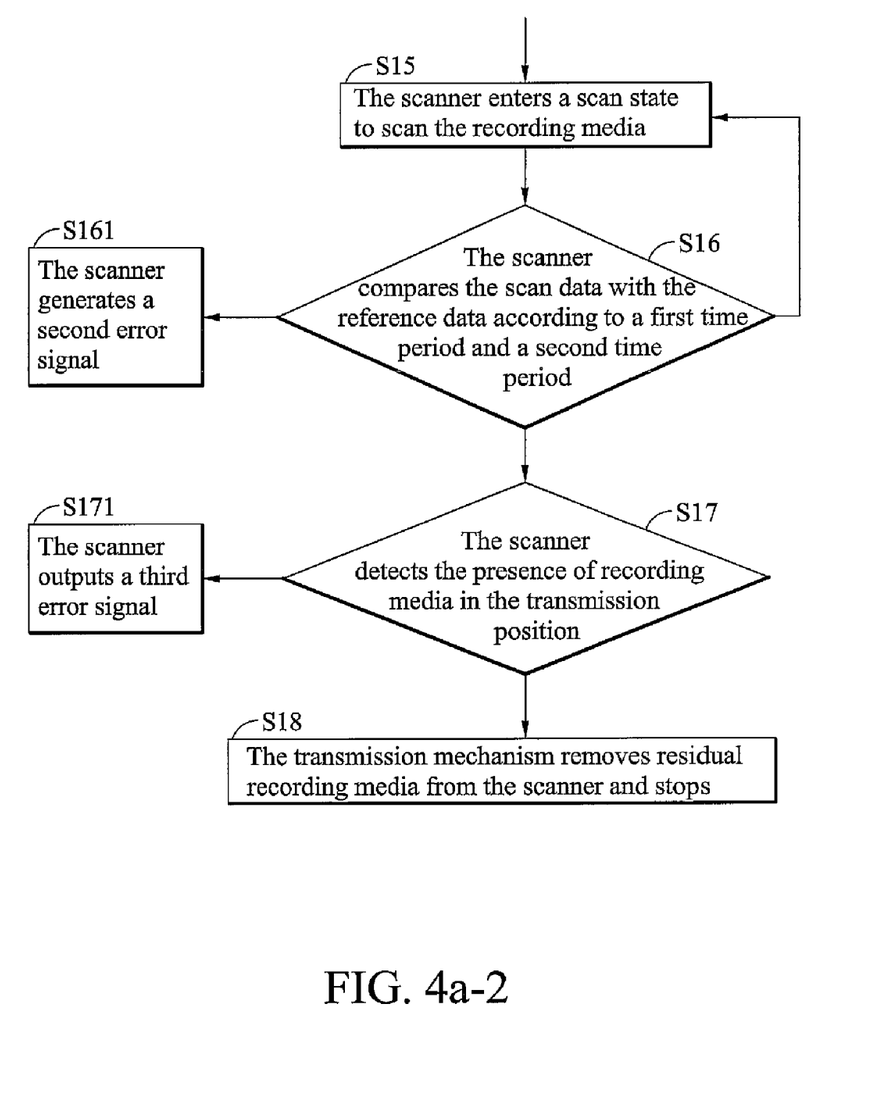
Figure 4B:
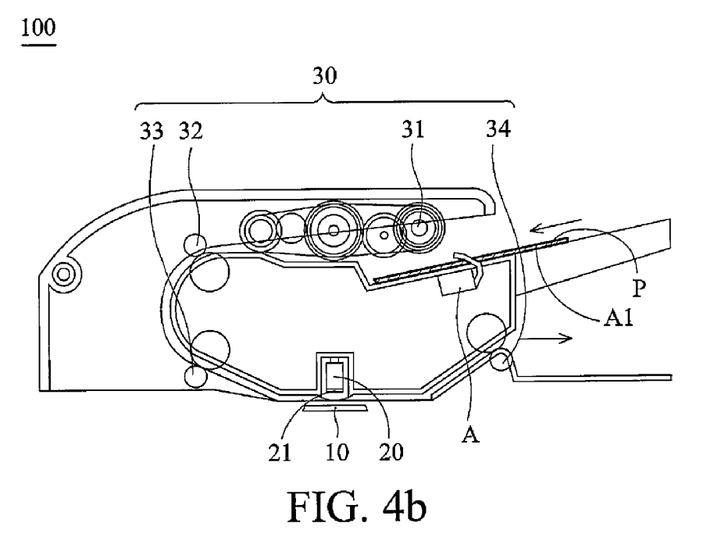
Figure 4C:
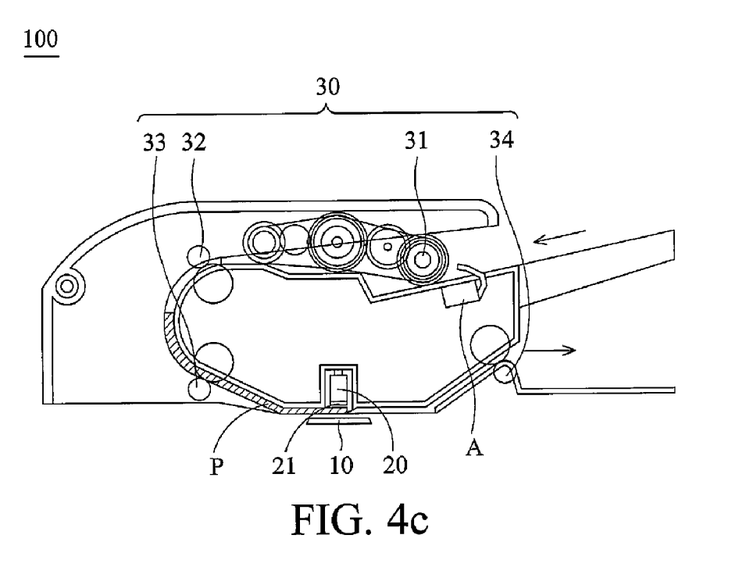

FIG. 4a is a flowchart of the first embodiment. First, a scan order is input to the scanner 100 in a preparation state accordingly (S11). Then, with reference to FIG. 4b, the media detector A detects the presence of recording media P in a transmission position A1 (S12). When present, the transmission mechanism 30 transmits the recording media P toward the image sensor 10 (S13). If there is no recording media P in the transmission position A1, the scanner 100 scans by flatbed (S121). Next, when the scanner 100 is in the preparation state, the image sensor 10 scans according to the time for transmitting the recording media P to the image sensor 10 to generate scan data, and the scanner 100 compares the scan data with the reference data (S14). With reference to FIG. 4c, if the scan data differs from the reference data, the recording media P is located between the image sensor 10 and the weight 20, and the scanner 100 enters a scan state (S15). If the scan data is continuously identical to the reference data, paper jam is indicated, and the scanner 100 outputs a first error signal (S141).

In a modified embodiment, in step S14, the image sensor 10 scans normally according to the steps of the transmission mechanism transmitting the recording media P to the image sensor to generate the scan data.

Figure 4D:
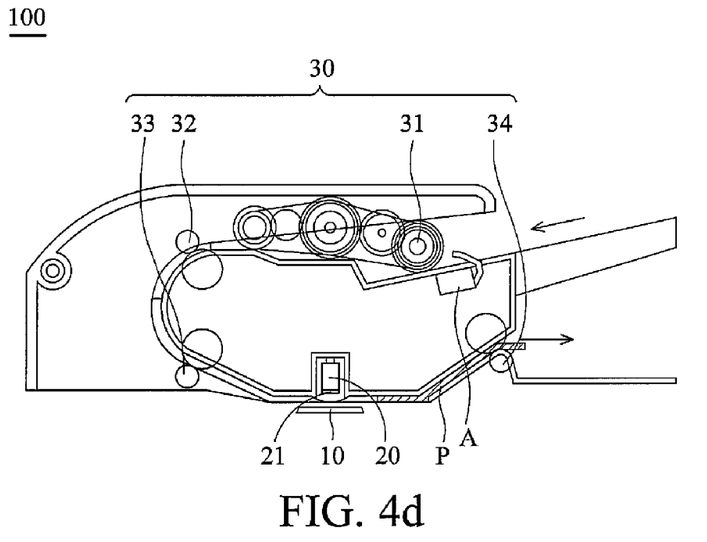

In the scan state, the image sensor 10 scans the recording media P (S15). Then, the scanner 100 compares the scan data with the reference data according to a first time period T1 and a second time period T2 (S16). The first time period T1 is the time required to scan one recording media P. The second time period T2 is shorter than the first time period T1. A first comparison result is achieved by comparing the scan data with the reference data according to the first time period T1. A second comparison result is achieved by comparing the scan data with the reference data according to the second time period T2. If the first comparison result is distinct, paper jam is indicated (for example, the recording media P is stopped as shown in FIG. 4c), and the scanner 100 generates a second error signal (S161). As shown in FIG. 4d, if the first comparison result is identical, the recording media P leaves the image sensor 10 and the weight 20, and the scanner 100 restarts the scan state to scan next recording media P (back to step S15). If the first comparison result is identical and the second comparison result is distinct, the scanner 100 functions normally.

If the first comparison result is identical and the second comparison result is identical, no recording media P passes between the image sensor 10 and the weight 20, and the scanner 10 detects the presence of recording media P in the transmission position A1 (S17). If no recording media P is present in the transmission position A1, the transmission mechanism removes residual recording media P from the scanner 100 and stops (S18). If recording media P is present in the transmission position A1, the scanner 100 outputs a third error signal (S171).

The embodiment reduces the number of detectors required and cost of the scanner 100.

Figure 5:
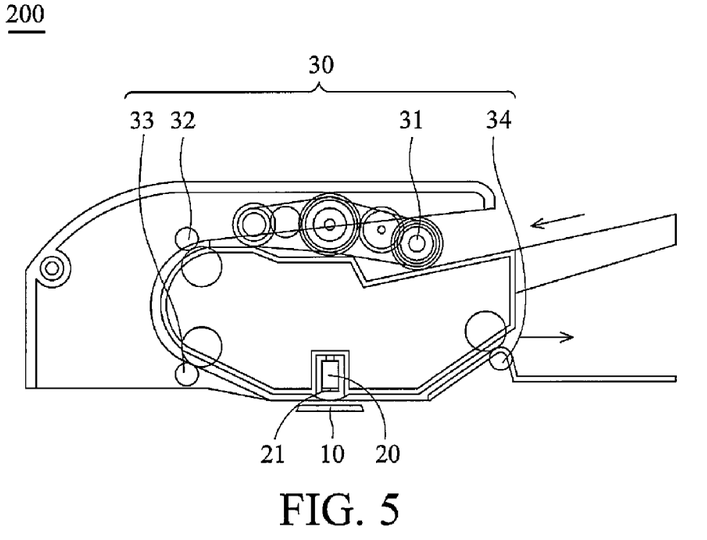
FIG. 5 shows a scanner of a second embodiment of the invention.

FIG. 5 shows a scanner 200 of a second embodiment, wherein the media detector A is omitted.

Figure 6:
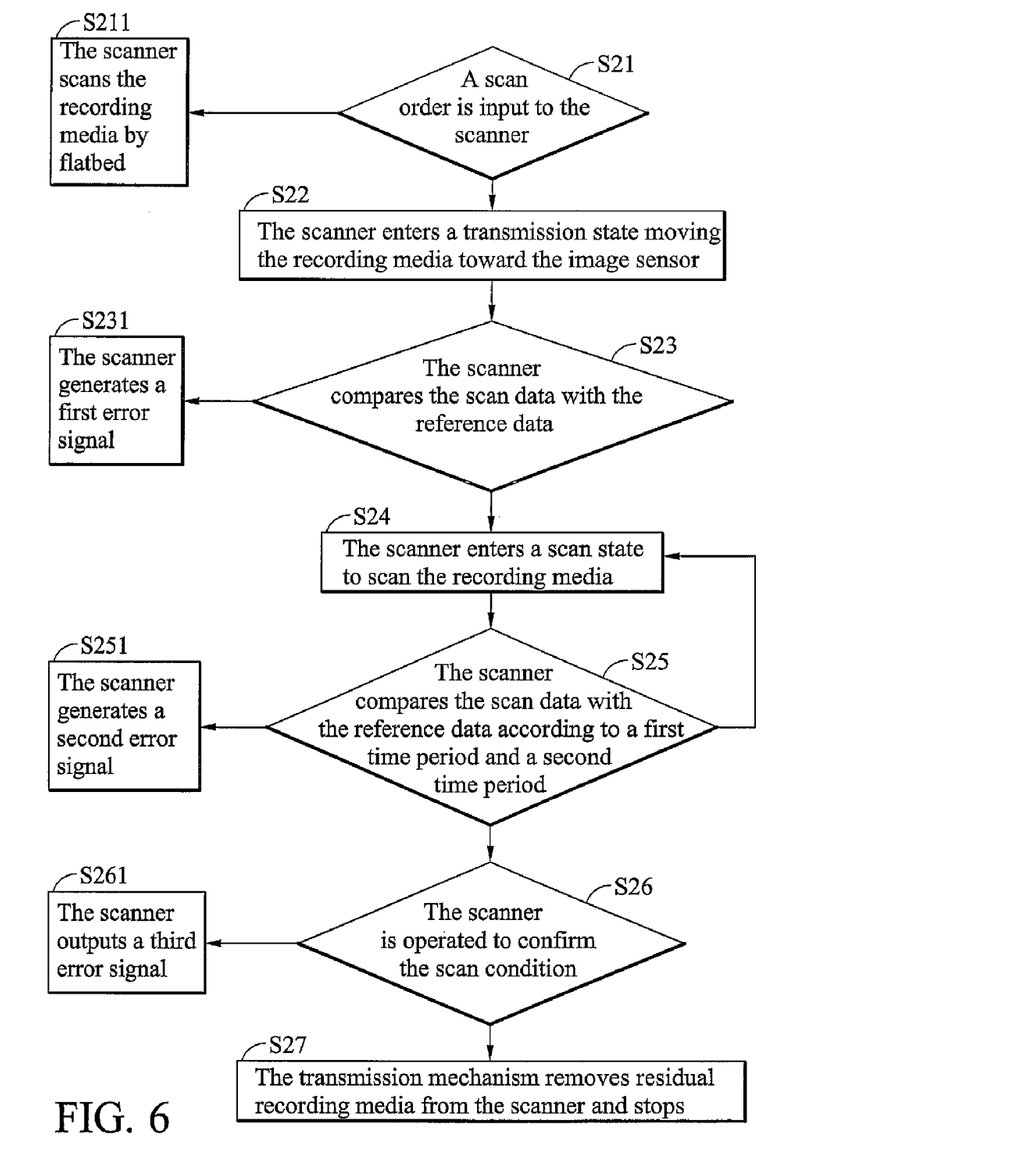
FIG. 6 is a flowchart of the second embodiment.

FIG. 6 is a flowchart of the second embodiment. First, a scan order is input to the scanner 200 (S21). If the flatbed is selected, the scanner 200 scans the recording media P by flatbed (S211). If the auto document feeder is utilized, the scanner 200 enters a transmission state moving the recording media P toward the image sensor 10 (S22).

After the transmission mechanism runs predetermined steps in the transmission state, the scanner compares the scan data with the reference data (S23). If the scan data is identical to the reference data, paper jam is indicated, and the scanner 200 generates a first error signal (S231). If the scan data is distinct from the reference data, the recording media P reaches the image sensor 10, and the scanner 200 enters a scan state (S24).

In the scan state, the image sensor 10 scans the recording media (S24). Then, the scanner 200 compares the scan data with the reference data according to a first time period T1 and a second time period T2 (S25). The first time period T1 is the time required to scan one recording media P. The second time period T2 is shorter than the first time period T1. A first comparison result is achieved by comparing the scan data with the reference data according to the first time period T1. A second comparison result is achieved by comparing the scan data with the reference data according to the second time period T2. If the first comparison result is distinct, paper jam is indicated, and the scanner 200 generates a second error signal (S251). If the first comparison result is identical, the recording media P leaves the image sensor 10 and the weight 20, and the scanner 200 restarts the scan state to scan next recording media P (back to step S24). If the first comparison result is identical and the second comparison result is distinct, the scanner 200 functions normally.

If the first comparison result is identical and the second comparison result is identical, there is no recording media passing between the image sensor 10 and the weight 20, and the scanner 200 is operated to confirm the scan condition (S26). If the absence of recording media P is confirmed, paper jam is indicated, and the scanner 200 outputs a third error signal (S261). If scan process completion is accomplished, the transmission mechanism removes residual recording media P from the scanner 200 and stops (S27).

The second embodiment further reduces the number of detectors required in the scanner, decreasing cost thereof.

The first time period T1 and the second time T2 period are dynamically modified according to real-time capacity of the memory of the scanner.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A scan method, comprising:
   providing a scanner, comprising an image sensor, a reference pattern and a transmission mechanism;
   scanning the reference pattern with the image sensor to generate reference data;
   transmitting at least one recording media passing between the reference pattern and the image sensor by the transmission mechanism;
   actuating the image sensor to generate scan data;
   comparing the scan data with the reference data, wherein, in a scan state, the scanner compares the scan data with the reference data according to a first time period achieving a first comparison result, and the scanner compares the scan data with the reference data according to a second time period achieving a second comparison result; and
   restarting the scan state if the first comparison result is identical and the second comparison result is distinct, and sending a second error signal if the first comparison result is distinct.

2. The scan method as claimed in claim 1, wherein the scanner further comprises a media detector.

3. The scan method as claimed in claim 2, further comprising:
   inputting a scan order, the scanner performing a preparation state according to the scan order;
   detecting a position of the recording media with the media detector; and
   transmitting the recording media toward the image sensor by the transmission mechanism when the recording media is in a transmission position.

4. The scan method as claimed in claim 3, wherein when the scanner is in the preparation state, the scanner compares the scan data with the reference data regularly, if the scan data is identical to the reference data, the scanner outputs a first error signal, and if the scan data is distinct from the reference data, the scanner enters the scan state.

5. The scan method as claimed in claim 3, wherein, in the preparation state, when the transmission mechanism runs predetermined steps, the scanner compares the scan data with the reference data, if the scan data is identical to the reference data, the scanner outputs a first error signal, and if the scan data is distinct from the reference data, the scanner enters the scan state.

6. The scan method as claimed in claim 2, wherein if the first comparison result is identical and the second comparison result is distinct, the media detector detects the recording media, if no recording media is present in the transmission position, the transmission mechanism outputs the recording medias and stops, and if recording media is detected in the transmission position, the scanner outputs a third error signal.

7. The scan method as claimed in claim 2, wherein when the scan state stops, the scanner stop scanning if the media detector finds no recording media in the transmission position.

8. The scan method as claimed in claim 1, further comprising:
inputting a scan order, and the scanner performing a transmission state according to the scan order;
moving the recording media by the transmission mechanism toward the image sensor.

9. The scan method as claimed in claim 8, wherein, in the transmission state, when the transmission mechanism runs predetermined steps, the scanner compares the scan data with the reference data, if the scan data is identical to the reference data, the scanner outputs a first error signal, and if the scan data is distinct from the reference data, the scanner enters the scan state.

10. The scan method as claimed in claim 8, wherein when the scanner is in the transmission state, the scanner compares the scan data with the reference data regularly, if the scan data is identical to the reference data, the scanner outputs a first error signal, and if the scan data is distinct from the reference data, the scanner enters the scan state.

11. The scan method as claimed in claim 8, wherein if the first comparison result is identical and the second comparison result is identical, the scanner is operated to confirm scan condition, absence of recording media is confirmed, the scanner outputs a third error signal, and if it is confirmed that scan process is accomplished, the transmission mechanism removes residual recording media from the scanner and stops.

12. A scanner to scan at least one recording media, comprising:
an image sensor;
a reference pattern, corresponding to the image sensor; and
a transmission mechanism, wherein the image sensor scans the reference pattern to generate reference data; the transmission mechanism transmits the recording media passing between the image sensor and the reference pattern; the image sensor is actuated to generate scan data; in a scan state, the scanner compares the scan data with the reference data according to a first time period achieving a first comparison result, and the scanner compares the scan data with the reference data according to a second time period achieving a second comparison result: and the scan state is restarted if the first comparison result is identical and the second comparison result is distinct, and the scanner sends a second error if the first comparison result is distinct.

13. The scanner as claimed in claim 12, further comprising a weight corresponding to the image sensor, wherein the reference pattern is located on the weight.

14. The scanner as claimed in claim 12, wherein the reference pattern comprises alternate black and white.

\* \* \* \* \*